Oct. 29, 1963    J. K. MILLS    3,109,133
COMPENSATING APPARATUS FOR FREQUENCY SENSITIVE REGULATORS
Filed Sept. 29, 1961
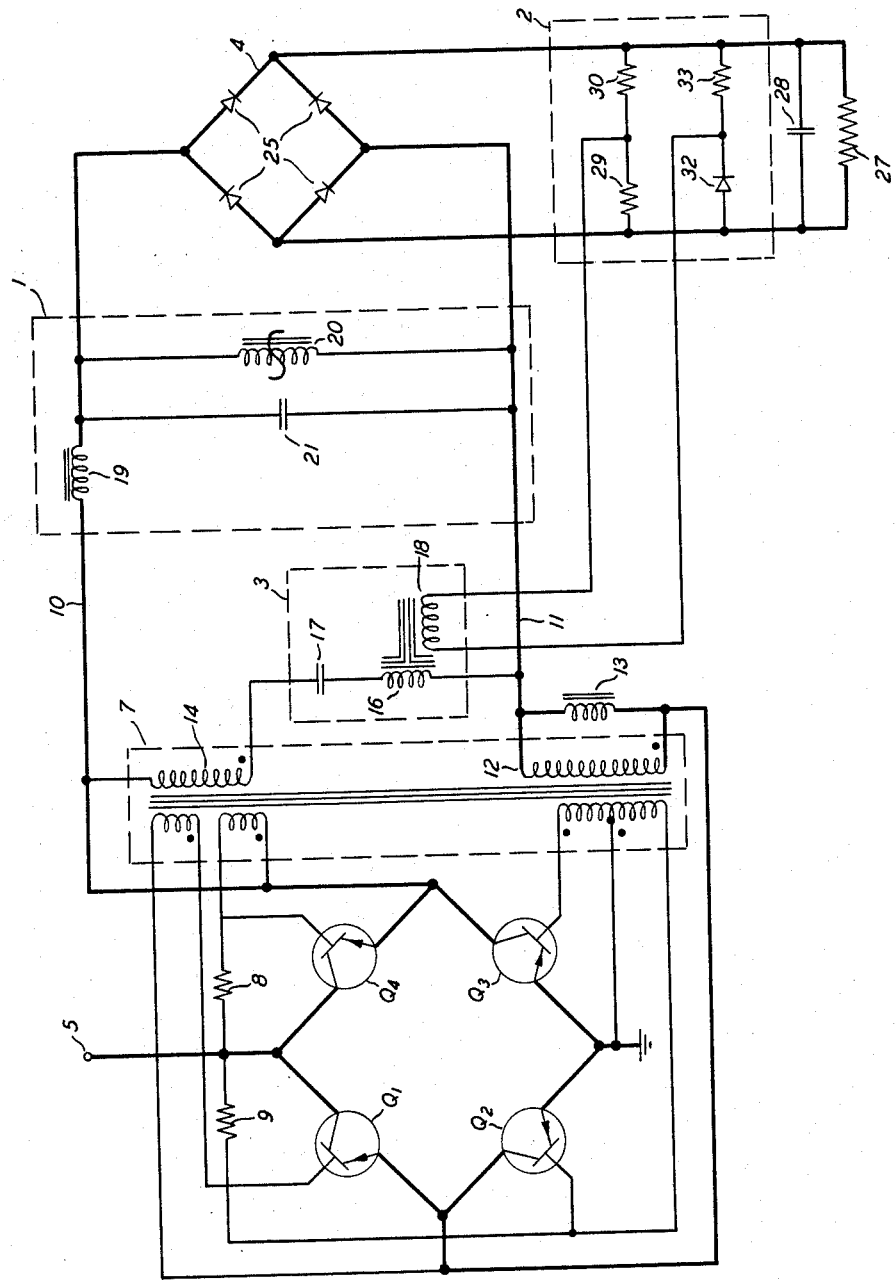
INVENTOR
J. K. MILLS
BY
ATTORNEY

United States Patent Office 3,109,133
Patented Oct. 29, 1963

3,109,133
COMPENSATING APPARATUS FOR FREQUENCY
SENSITIVE REGULATORS
John K. Mills, Morristown, N.J., assignor to Bell Telephone Laboratories, Incorporated, New York, N.Y., a corporation of New York
Filed Sept. 29, 1961, Ser. No. 141,796
2 Claims. (Cl. 321—2)

The present invention relates to voltage regulated power supplies and, more particularly, to means for regulating the magnitude of the output voltage delivered by a power supply which employs ferro-resonant regulating apparatus.

Ferro-resonant regulators of the type contemplated by the present invention have long been advantageously employed to regulate the magnitude of alternating-current voltages. Such devices are capable of regulating the root mean square, average and peak-to-peak values of the output voltage. The input power factor and the efficiency of these devices are quite good; furthermore, the response to load and input voltage changes is fast (approximately one-half cycle). However, the regulator is sensitive to frequency changes in the alternating-current supply voltage, an increase in frequency resulting in an increase in the magnitude of the output voltage. While this frequency sensitive characteristic of the ferro-resonant regulator presents no problem when the source of alternating-current energy employed is common "line voltage" having a constant frequency of 60 cycles per second, it does prove to be troublesome where D.C. to A.C. inverters are used to provide the alternating-current input voltage. This is particularly true for those inverters whose operating frequency is in part determined by the magnitude of load current.

Accordingly, it is an object of the present invention to regulate the magnitude of the output voltage delivered by a power supply which includes the combination of D.C. to A.C. inverter and a ferro-resonant regulator and, more particularly, to provide means for compensating for the frequency sensitive characteristic of the ferro-resonant device.

A further object of the present invention is to advantageously employ the frequency versus output voltage characteristic of a ferro-resonant device in order to provide a power supply having improved voltage regulation.

In a principal aspect, the present invention takes the form of a voltage regulated power supply comprising a ferro-resonant regulator whose input power is supplied by an inverter having controllable frequency. In accordance with a principal feature of the invention, means are employed for adjusting the operating frequency of the inverter in response to variations in the magnitude of the output voltage delivered by the ferro-resonant device. In this manner, the frequency sensitive nature of the ferro-resonant regulator is used to improve the output voltage regulation of the power supply.

For a clearer understanding of the invention, reference may be made to the following detailed description and the accompanying drawing, the single FIGURE of which is a schematic diagram of a specific embodiment of the invention.

The apparatus illustrated in the drawing is a D.C. to D.C. power converter whose output voltage is regulated in accordance with the invention. In the drawing dotted lines enclosing various portions of the circuitry have been used in order to clarify their functional relationship. The heavy lines designate those conductors which deliver power from the source to the load.

The inverter circuitry which comprises PNP junction transistors $Q_1$, $Q_2$, $Q_3$ and $Q_4$ arranged in a bridge configuration, converts unregulated direct-current voltage from the source into alternating-current energy. This alternating-current energy is applied to the ferro-resonant regulator 1 which, in turn, delivers an alternating-current voltage of regulated amplitude to a bridge rectifier 4. The bridge rectifier 4 converts this alternating-current energy into a regulated D.C. voltage. An error detection circuit 2 which is connected in parallel with the load, delivers a unidirectional current to the frequency controlling circuit 3. This direct current has a magnitude which is related to the magnitude of the voltage across the load. Frequency controlling circuit 3 alters the operating frequency of the inverter in accordance with variations in load voltage. Since the output voltage from the ferro-resonant regulator 1 is dependent upon the frequency of the alternating-current energy delivered to its input (an increase in frequency resulting in an increase in output voltage), the feedback path formed by the error detector 2 and the frequency controlling circuit 3 provides a regulated output voltage.

The inverter circuitry shown in the drawing employs the transistor switching principles disclosed in U.S. application Serial No. 141,799, entitled "Transformerless Power Conversion Apparatus" filed September 29, 1961, by J. K. Mills. As shown in the drawing, the emitter electrodes of transistors $Q_2$ and $Q_3$ are connected in common to ground. The collector electrode of transistor $Q_2$ is connected to the emitter electrode of transistor $Q_1$. Similarly, the collector electrode in transistor $Q_3$ is connected to the emitter electrode of transistor $Q_4$. The collector electrodes of transistors $Q_1$ and $Q_4$ are connected in common to terminal 5. An unregulated, negative, unidirectional potential from an available power source is applied between the input terminal 5 and ground. Feedback transformer 7 is provided with four secondary windings, each of which is directly connected between the base and emitter electrodes of one of the four inverter transistors, respectively. These secondary windings are arranged, as is shown by the "dot" convention, to respond to flux changes in the core of the secondary winding such that transistors $Q_1$ and $Q_3$ are turned On and Off together. Similarly, transistors $Q_2$ and $Q_4$ operate in identical fashion. The inverter is provided with two starting resistances, one of which, resistance 8, is connected between the negative input terminal 5 and the base electrode of transistor $Q_4$, and the other, resistance 9, is connected between the negative input terminal 5 and the base electrode of transistor $Q_2$. Conductor 10 which is connected to the juncture of transistors $Q_3$ and $Q_4$ forms one output conductor from the inverter. The other output conductor 11 is connected to the juncture of transistors $Q_1$ and $Q_2$ by means of the parallel combination of primary winding 12 and shunt inductor 13.

Before discussing the manner in which the operating frequency of the inverter is controlled, it will be helpful to discuss the circuit as it would operate without the frequency controlling circuitry. For the purposes of obtaining a better understanding of the manner in which the four transistors are switched On and Off, it may be assumed that the input impedance to the ferro-resonant regulator acts as a purely resistive load. When the negative input voltage is applied to terminal 5, starting resistances 8 and 9 "forward bias" transistors $Q_4$ and $Q_2$, turning them On. Positive current then flows from the grounded emitter terminal of transistor $Q_2$ through transistor $Q_2$, through the parallel combination of primary winding 12 and inductor 13, through the resistive load exhibited by the input to the ferro-resonant regulator and finally through the transistor $Q_4$ to the negative input terminal 5. Since the impedance of primary winding 12 is merely the "reflected" base-to-emitter impedance of the four transistors, whereas the shunt inductor 13 has a much higher inductance, nearly all of the current flowing from the collector of transistor $Q_2$ into the load initially flows through the primary winding 12. The induced voltages in the secondary windings drive transistors $Q_2$ and $Q_4$ even farther into a highly conductive saturated state. At the same time, transistors $Q_1$ and $Q_3$ are turned Off. As current continues to flow, however, inductance 13 shunts an increasing portion of the load current around primary winding 12. In this manner the current through the primary winding 12 is "starved" by the action of the shunt inductor. As the voltages induced in the secondary windings decrease, transistors $Q_2$ and $Q_4$ eventually are brought out of saturation. At this time they begin to exhibit a substantial voltage drop. This voltage drop across transistors $Q_2$ and $Q_4$ causes the load current flowing in conductor 11 to decrease. Current cannot decrease in the shunt inductor 13, instantaneously, however, and this inductor then induces a circulating current through primary winding 12 in the opposite direction to the original current flow. This induced circulating current immediately turns Off transistors $Q_2$ and $Q_4$ and turns On transistors $Q_1$ and $Q_3$. Current now flows through the load and conductors 10 and 11 in the opposite direction to the original current flow. This cycle is repeated at a regular repetition rate such that an alternating current is delivered to the ferro-resonant regulator.

The frequency control circuit 3 in combination with an auxiliary primary winding 14 provides a means of controlling the frequency of switching in response to the magnitude of a D.C. control current. The frequency controlling circuit 3 comprises the serially connected combination of an inductance 16 and a capacitor 17. The core of inductance 16 is also provided with an additional winding—a D.C. control current winding 18. The inductance of inductor 16 may be varied by passing a current through the D.C. control winding 18 in order to saturate the core to the desired degree. Since the inductor 16 and capacitor 17 are serially connected with the primary winding 14 across the load voltage, an alternating current will flow through primary winding 14. The phase of this current will lead or lag the load voltage depending on the nature of the reactance represented by the circuit path comprising inductance 16, capacitor 17 and the primary winding 14. Since the primary winding 14 coacts with the primary winding 12 to induce voltages in the four secondary windings, the switching frequency may be somewhat altered by the current flowing in primary winding 14. If, for instance, this current tends to lead the current flowing in primary winding 12, the frequency of inversion will thereby be increased. Accordingly, if the current through the auxiliary primary winding 14 lags the current through primary winding 12, the switching frequency will be decreased. In this embodiment of the invention frequency control circuit 3 is arranged such that an increase in the control current through winding 18 saturates the core of inductor 16 to an increasing degree thereby lowering the inductance of inductor 16. Since the inductive reactance of the control circuit is thereby reduced, the phase of the current through winding 14 leads the load voltage to an increasing degree. As discussed earlier, the switching frequency of the inverter will thereby increase since those transistors which are conducting will be brought out of saturation slightly earlier in each half-cycle.

The laternating-current energy developed by the inverter circuit in the manner described above, is applied to the input of the ferro-resonant regulator by conductors 10 and 11. The ferro-resonant regulator consists of a linear inductor 19, a saturating reactor 20 and a linear capacitor 21. Capacitor 21 and reactor 20 are connected in parallel across the alternating-current output and linear inductor 19 is serially connected with conductor 10. The core of inductor 19 is constructed with a large air gap to insure an inductance that is esentially linear over the range of magnetomotive force encountered in circuit operation. The core of reactor 20 is characterized by a substantially square hysteresis loop.

Since a detailed description of the operation of ferro-resonant regulator 1 is not necessary in order to understand the operation of the present invention, it will not be included here. A detailed discussion of this type of regulator may be found in the article entitled "Magnetic Voltage Reference," pp. 200, A.I.E.E. Conference of Magnetic Amplifiers, July 1956, E. Manteuffel and R. O. McCary. It is important to note, however, that the magnitude of the voltage delivered by the regulator is inversely related to the "volt-second area" of each half-cycle of the alternating-current energy. Since an increase in the frequency of the A.C. input voltage decreases the volt-second area of each half-cycle, the output voltage increases. Correspondingly, a decrease in frequency will decrease the output voltage. This relationship between frequency and output voltage is substantially linear within the operating range of the regulator.

The output conductors of ferro-resonant regulator 1 are connected to a well-known bridge rectifier circuit 4 comprising diodes 25. The output of the bridge rectifier 4 is directly connected to the parallel combination of a filter capacitor 28 and a load resistance 27 such that a direct-current voltage is applied across the load.

The error detection circuit 2 comprises two voltage dividers serially connected across the load, one of which is made up of resistances 29 and 30 while the other is made up of a Zener diode 32 serially connected with resistance 33. Zener diode 32 is a well-known device having a specified "breakdown potential." The error detection circuit 2 is arranged such that the voltage at the juncture of Zener diode 32 and resistance 33 is of a more positive potential than the voltage of the juncture of resistances 29 and 30. Consequently, current normally flows from the juncture of diode 32 and resistance 33 through the direct-current control winding 18 of frequency control circuit 3 to the juncture of resistances 29 and 30. Should the load voltage increase, for example, the potential at the juncture of resistances 29 and 30 will also increase, thereby reducing the current in the direct-current control winding 18. An increase in load voltage, therefore, will increase the inductance of inductor 16 since its core will become less saturated. This increase in inductance causes the phase of the current in primary winding 14 to lag its former position such that transistor switching in the inverter is initiated less rapidly than before. The consequent decrease in the operating frequency of the inverter decreases the frequency of the alternating-current energy input to the ferro-resonant regulator. As discussed earlier, this decrease in frequency causes a decrease in the output voltage from the ferro-resonant regulator, thereby tending to cancel out the original voltage increase.

The embodiment of the invention diagramed in the drawing and discussed in the detailed description above is, of course, only an example of an application of the principles of the invention. Those skilled in the art may easily devise other forms of the ferro-resonant regulator 1, the error detection circuit 2, or the frequency control circuit 3. The inverter circuitry as well as the rectifier and load circuits are, of course, only examples of many possible circuits which might be used to instrument the invention. While many modifications and changes may be made in the construction, details, and features of this invention without departing from the spirit and scope thereof, the invention is to be limited only by the scope of the appended claims.

What is claimed is:

1. A regulated power supply comprising, in combination, a source of direct-current voltage, a transistor inverter for converting said direct-current voltage into alternating-current energy, said inverter having a saturable core inductor for determining the frequency of said alternating-current energy, a load circuit, a ferro-resonant regulator connecting said inverter and said load circuit, means for developing a direct-current control voltage in response to the magnitude of alternating-current energy delivered to said load, and circuit means including an auxiliary winding on said saturable core inductor for varying the frequency of said alternating-current energy in response to changes in the magnitude of said control voltage.

2. In combination, a source of direct-current energy, an inverter for converting said direct-current energy into alternating-current energy, said inverter being provided with a saturable core inductor the inductance of which in part determines the frequency of said alternating-current energy, a rectifier having an input and an output, a ferro-resonant regulator connected between said inverter and the input of said rectifier for applying an alternating-current voltage to said rectifier, a load connected to the output of said rectifier such that a direct-current voltage is supplied across said load, a source of a reference voltage, means to generate a control voltage having a magnitude related to the difference between the magnitude of said reference voltage and the voltage across said load, and means for varying the degree of saturation of said inductor in response to variations in the magnitude of said control voltage.

References Cited in the file of this patent
UNITED STATES PATENTS

| | | |
|---|---|---|
| 2,886,763 | Zelina | May 12, 1959 |
| 2,999,972 | Stroman | Sept. 12, 1961 |
| 3,041,523 | Kuba | June 26, 1962 |